(12) United States Patent
Wood et al.

(10) Patent No.: US 12,084,166 B2
(45) Date of Patent: Sep. 10, 2024

(54) SYSTEMS AND METHODS FOR IMPROVED PROPELLER DESIGN

(71) Applicant: GENERAL ELECTRIC COMPANY, Schenectady, NY (US)

(72) Inventors: Trevor Howard Wood, Niskayuna, NY (US); Kishore Ramakrishnan, Niskayuna, NY (US); Davide Giacché, Garching (DE); Angela Knepper, Gloucester (GB); Nicholas Bown, Gloucester (GB); Rathakrishnan Bhaskaran, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 180 days.

(21) Appl. No.: 17/108,431

(22) Filed: Dec. 1, 2020

(65) Prior Publication Data

US 2021/0147065 A1    May 20, 2021

Related U.S. Application Data

(63) Continuation of application No. 15/860,280, filed on Jan. 2, 2018, now Pat. No. 11,040,767.
(Continued)

(51) Int. Cl.
*B64C 11/18* (2006.01)
*B64C 11/14* (2006.01)
(Continued)

(52) U.S. Cl.
CPC .............. *B64C 11/18* (2013.01); *B64C 11/14* (2013.01); *B64D 33/02* (2013.01);
(Continued)

(58) Field of Classification Search
CPC ......... B64C 11/18; B64C 11/14; B64D 33/02; B64D 2033/0293; F02C 7/04; F05D 2220/323
See application file for complete search history.

(56) References Cited

U.S. PATENT DOCUMENTS 1,792,015 A * 2/1931 Herrick ..................... B64C 3/14
244/35 R
2,345,047 A    3/1944 Howard
(Continued)

FOREIGN PATENT DOCUMENTS

CA    2917967 A1    1/2016
CN    1036182 A    10/1989
(Continued)

OTHER PUBLICATIONS

Wright et al., "Blade Sweep for Low-Speed Axial Fans", International Gas Turbine and Aeroengine Congress and Exposition Conference, http://proceedings.asmedigitalcollection.asme.org/proceeding.aspx?articleid=2209247, Jun. 4-7, 1989.
(Continued)

*Primary Examiner* — Courtney D Heinle
*Assistant Examiner* — Andrew Thanh Bui
(74) *Attorney, Agent, or Firm* — McGarry Bair PC (57) ABSTRACT

An aircraft assembly includes an engine, and intake, and a propeller assembly. The engine is mounted to at least one of a wing or fuselage of an aircraft. The intake is configured to provide air to the engine. The intake includes a body having an engine inlet through which air enters the intake. The propeller assembly includes propeller blades coupled to and driven by the engine. The propeller assembly is spaced an axial distance from the inlet opening of the intake wherein air passing by the propeller blades enters the intake. The propeller assembly has a propeller configuration that is at least one of sized or shaped to optimize performance of the (Continued)

propeller assembly based on an interaction between the propeller assembly and the intake.

20 Claims, 5 Drawing Sheets

Related U.S. Application Data (60) Provisional application No. 62/592,538, filed on Nov. 30, 2017.

(51) Int. Cl.
*B64D 33/02* (2006.01)
*F02C 7/04* (2006.01)

(52) U.S. Cl.
CPC ........ *B64D 2033/0293* (2013.01); *F02C 7/04* (2013.01); *F05D 2220/323* (2013.01)

(56) References Cited

U.S. PATENT DOCUMENTS

| | | | |
|---|---|---|---|
| 2,934,150 | A | 4/1960 | Fink |
| 4,412,664 | A * | 11/1983 | Noonan ............... B64C 3/14 |
| | | | 416/223 R |
| 4,419,053 | A | 12/1983 | Swearingen, Jr. |
| 4,519,746 | A | 5/1985 | Wainauski |
| 4,790,725 | A | 12/1988 | Bousquet et al. |
| 4,927,331 | A | 5/1990 | Vuillet |
| 5,209,643 | A * | 5/1993 | Cole .................. B64C 11/18 |
| | | | 416/223 R |
| 5,252,381 | A * | 10/1993 | Adler .................. B64C 3/14 |
| | | | 428/156 |
| 5,603,607 | A * | 2/1997 | Kondo ................ F04D 29/661 |
| | | | 415/119 |
| 5,961,067 | A | 10/1999 | Hall et al. |
| 7,530,787 | B2 | 5/2009 | Bertolotti et al. |
| 9,359,072 | B2 | 6/2016 | Finck et al. |
| 9,587,496 | B2 | 3/2017 | Collins et al. |
| 9,878,775 | B2 | 1/2018 | Vander Lind et al. |
| 10,040,559 | B2 | 8/2018 | Hoisington |
| 10,690,110 | B2 | 6/2020 | Church |
| 10,895,161 | B2 * | 1/2021 | Vogiatzis ............... F01D 5/16 |
| 10,947,852 | B2 | 3/2021 | Schuring |
| 2008/0159868 | A1 | 7/2008 | Kray et al. |
| 2011/0142666 | A1 | 6/2011 | Drobietz et al. |
| 2012/0034095 | A1 | 2/2012 | Towkan |
| 2014/0308124 | A1 | 10/2014 | Moore et al. |
| 2015/0056058 | A1 | 2/2015 | Grossom et al. |
| 2015/0344127 | A1 | 12/2015 | Wood et al. |
| 2017/0029091 | A1 | 2/2017 | Linch et al. |
| 2017/0152020 | A1 | 6/2017 | Wood et al. |
| 2017/0175627 | A1 | 6/2017 | Wood et al. |
| 2017/0233068 | A1 | 8/2017 | Eller et al. |
| 2020/0331602 | A1 * | 10/2020 | Mikic ................. B64C 11/303 |

FOREIGN PATENT DOCUMENTS

| | | |
|---|---|---|
| CN | 101233045 A | 7/2008 |
| CN | 102897314 A | 1/2013 |
| CN | 103287572 A | 9/2013 |
| CN | 104834774 A | 8/2015 |
| CN | 105283666 A | 1/2016 |
| CN | 205047251 U | 2/2016 |
| CN | 106029495 A | 10/2016 |
| CN | 206202665 U | 5/2017 |
| EP | 2218874 A2 | 8/2010 |
| GB | 858706 A1 | 1/1961 |
| IN | 106795863 A | 5/2017 |
| WO | 9951868 A1 | 10/1999 |

OTHER PUBLICATIONS

European Patent Office, Search Report in Application No. 18208388. 1; Apr. 17, 2019; 7 pages; Munich, Germany.

Longhouse et al., "Control of Tip-Vortex Noise of Axial Flow Fans by Rotating Shrouds", Journal of Sound and Vibration, vol. 58, Issue 02, pp. 201-214, May 22, 1978. (14 pages).

Khalid et al., "Open Rotor Designs for Low Noise and High Efficiency", Turbine Technical Conference and Exposition, Jun. 3-7, 2013. (14 pages).

European Patent Office, Extended European Search Report re Corresponding Application No. 20207714.5-1010, Feb. 17, 2021, 8 pages, Munich, Germany.

\* cited by examiner

SYSTEMS AND METHODS FOR IMPROVED PROPELLER DESIGN

RELATED APPLICATIONS

This application is a continuation of U.S. patent application Ser. No. 15/860,280 filed Jan. 2, 2018, which is claims priority to U.S. Provisional Application Ser. No. 62/592,538, filed 30 Nov. 2017 and entitled "Systems and Methods for Improved Propeller Design," the entire subject matter of which are hereby incorporated in their entirety.

FIELD

Embodiments of the subject matter described herein relate to propeller assemblies for aircraft.

BACKGROUND

Propellers may be driven by an engine to provide thrust for an aircraft. A propeller may be disposed proximate an intake for the engine, with the propeller affecting the airflow entering the engine as the propeller is rotated by the engine. Various conventional design approaches place the propellers as close as possible or practical. However, such placement can result in decreased performance and/or increased noise.

BRIEF DESCRIPTION

In an embodiment, an aircraft assembly includes an engine, and intake, and a propeller assembly. The engine is mounted to an aircraft. The intake is configured to provide air to the engine. The intake includes a body having an inlet opening through which air enters the intake. The propeller assembly includes propeller blades coupled to and driven by the engine. The propeller assembly is spaced an axial distance from the inlet opening of the intake wherein air passing by the propeller blades enters the intake. The propeller assembly has a propeller configuration, with at least a portion of the propeller configuration at least one of sized or shaped to optimize performance of the propeller assembly based on an interaction between the propeller assembly and the intake.

In an embodiment, an aircraft assembly includes an engine, and intake, and a propeller assembly. The engine is mounted to an aircraft. The intake is configured to provide air to the engine. The intake includes a body having an inlet opening through which air enters the intake. The propeller assembly includes propeller blades coupled to and driven by the engine. The propeller assembly is spaced an axial distance from the inlet opening of the intake wherein air passing by the propeller blades enters the intake. The propeller assembly has a propeller configuration that specifies at least one of: 1) the axial distance from the propeller to the intake; 2) propeller aerodynamic loading distribution; 3) propeller root trailing edge airfoil (e.g., cuff) shape; or 4) propeller spinner shape. At least a portion of the propeller configuration is at least one of sized or shaped to optimize performance of the propeller assembly based on an interaction between the propeller assembly and the intake.

In another embodiment, a method includes modelling behavior of a propeller assembly to be driven by an engine. The propeller assembly includes propeller blades coupled to and driven by the engine. The modelling includes accounting for interaction between the propeller assembly and the engine. The method also includes determining a propeller assembly configuration based on the modelling to optimize performance of the propeller assembly based on the interaction between the propeller assembly and the intake.

BRIEF DESCRIPTION OF THE DRAWINGS

The inventive subject matter described herein will be better understood from reading the following description of non-limiting embodiments, with reference to the attached drawings, wherein below.

DETAILED DESCRIPTION

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

As used herein, the terms "system" or "device" may include a hardware and/or software system that operates to perform one or more functions. For example, a unit, device, or system may include a computer processor, controller, or other logic-based device that performs operations based on instructions stored on a tangible and non-transitory computer readable storage medium, such as a computer memory. Alternatively, a unit, device, or system may include a hard-wired device that performs operations based on hard-wired logic of the device. The units, devices, or systems shown in the attached figures may represent the hardware that operates based on software or hardwired instructions, the software that directs hardware to perform the operations, or a combination thereof. The systems, devices, or units can include or represent hardware circuits or circuitry that include and/or are connected with one or more processors, such as one or computer microprocessors.

One or more embodiments of the inventive subject matter described herein provide systems and methods for improved design of propeller assemblies and/or corresponding intakes for aircraft. For example, as a propeller passes an engine inlet at high aircraft flight speeds, the inlet back-pressures the propeller and further exacerbates the challenge of maintaining the flow attached as the propeller passes the inlet. Flow separation caused by this interaction may be referred to herein as propeller-inlet interaction induced flow separation. Generally, various embodiments provide propeller assembly configurations (and/or intake configurations) that account for interactions between propeller assemblies and intakes or inlets. For example, a design may be selected as part of an optimization process that analyzes the resulting performance caused by varying one or more parameters of propeller assembly configuration using a modelling process that takes into account interactions between propeller assemblies and intakes. In various embodiments, for example, a propeller blade may be modelled over a complete rotation, with inlet effects and interaction utilized during one portion of the rotation, and inlet effects and interaction not utilized during another portion of the rotation.

For example, for highspeed flight conventional wisdom teaches that a space between a propeller and inlet should be as small as possible to capture the maximum amount of air increased in stagnation pressure by the action of the propellers. However, the action of the inlet pressure field can cause flow separation on the upstream propellers, leading to reduced stagnation pressure, which can be relieved by longer spacing between the propellers and the inlet. Accordingly, various embodiments provide improved performance and/or reduced noise (e.g., by addressing propeller-inlet interaction induced flow separation) by utilizing optimized propeller intake spacing determined using modelling that takes propeller intake interactions into account.

As another example, conventional wisdom teaches that propeller design entails a trade-off between aerodynamically loading the tip (e.g., to provide thrust) against un-loading the tip (e.g., to reduce noise). However, while unloading the tip may reduce noise for a low frequency tone, higher frequencies may be penalized, due to installation effects, and/or propeller-intake interaction (also referred to herein as propeller-inlet interaction). As inlet spacing decreases, the interaction may increasingly penalize noise. Various embodiments provide improved performance (e.g., by addressing propeller-inlet interaction induced flow separation) by lowering both tip loading as well as loading in front of the inlet or intake to help avoid or reduce propeller-inlet interaction losses associated with flow separation on the propellers. Various embodiments provide an optimization process that includes propeller induced and adiabatic efficiency results throughout the full rotation of the propeller blade.

As one more example, conventional wisdom teaches the minimization of propeller trailing edge thickness within manufacturing or mechanical limitations to improve propeller aerodynamic efficiency. However, conventional turboprop propellers are generally designed using circumferentially-averaged representations of the aircraft and engine flow conditions, and hence neglect the unsteady interactions associated with installation effects. Propeller-inlet interactions may be particularly severe and lead to flow separation on the propeller as it passes the inlet, leading to performance losses to both the propeller and the engine inlet (e.g., due to lower inlet stagnation pressure), and also lead to increased aero-acoustic noise. Accordingly, various embodiments consider the propeller airfoil design to be subjected to a highly decelerating flow stream (e.g., due to the inlet) in the propeller rotating frame of reference, and provide trailing edge thickness (e.g., trailing edge thickness of a cuff) that is increased relative to the airfoil maximum thickness to stay within flow diffusion limits and avoid or reduce flow separation. Various embodiments balance increased drag associated with the airfoil by designing simultaneously for the nearly isolated flow conditions away from the inlet and wing interactions and ensuring negligible increases in base drag, while improving the airfoil drag when subject to inlet interaction and flow diffusion, which also address propeller-inlet interaction induced flow separation.

Further still, various embodiments provide novel designs for propeller spinner profiles additionally or alternatively to other design aspects discussed herein, which also address propeller-inlet interaction induced flow separation. While a thick airfoil at the root section of the propeller is necessary for structural reasons, it exacerbates the challenge of controlling flow separation. Also, there are physical limitations regarding how long the propeller chord length may be to fit the installation without interference. It may be noted that from the propeller leading edge to the location of maximum airfoil thickness, the flow around the propeller accelerates to a very high flow velocity, and correspondingly a low air pressure. Various embodiments modify the spinner flow path to diffuse the flow (e.g., radially inward) to reduce peak Mach number at the airfoil maximum thickness location. It may be noted that the flow diffusion from the point of maximum thickness to the trailing edge is exacerbated when the propeller passes the engine inlet. Various embodiments modify the spinner flow path to reduce this propeller flow diffusion rate (e.g., radially outward). A design procedure known as area ruling, typically used for higher Mach flight applications, is conventionally applied using average flow blockage profiles of the spinner and propeller. Various embodiments disclosed herein, however, account for the unsteady influence of the downstream inlet and flow diverter blockage on the propeller as it passes in front of the inlet by area-ruling the spinner flow path optimally for the actual distorted flowfield the propeller is subjected to in contrast to a circumferentially-average representation. Due to the non-linear response of the flow in these conditions, this leads to a different area-ruling solution.

It may be noted that the improvement or optimization of performance (e.g., by addressing an interaction between a propeller assembly and intake) may be understood as improving or optimizing performance relative to a baseline or conventional design that does not consider the interaction (e.g., unsteady interaction) between the propeller assembly and intake.

The various embodiments are described in more detail herein with reference to the accompanying figures.

Figure 1:
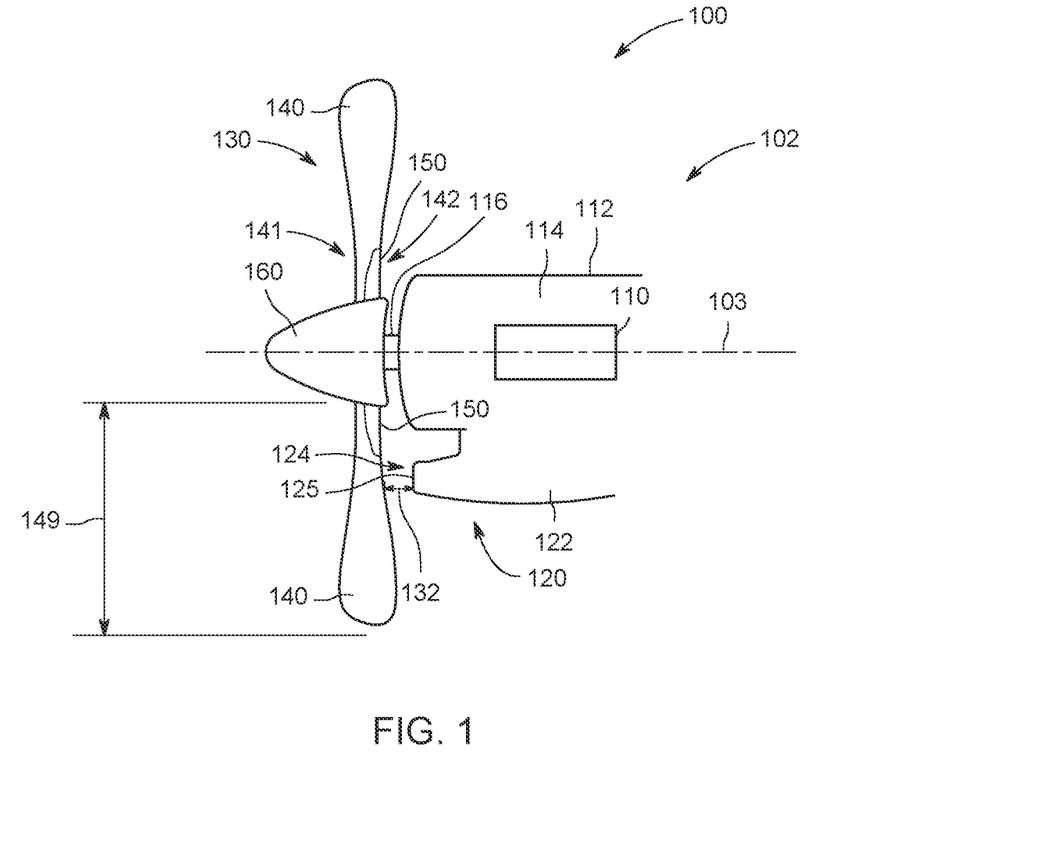
FIG. 1 is a schematic block view of an assembly (e.g., an assembly including a propeller for an aircraft) according to an embodiment.

FIG. 1 provides a side schematic view of an assembly 100. Generally, the assembly 100 may be mounted to or form part of an aircraft 102, and used to provide thrust enabling the aircraft 102 to fly. The depicted example assembly 100 includes an engine 110, an intake 120, and a propeller assembly 130. The intake 120 receives a volume of air, at least a portion of which has passed through or been impacted by the propeller assembly 130, with the volume of air provided to the engine 110 for combustion. The engine 110 provides an output (e.g., rotates an output shaft 116) that causes the propeller assembly 130 to rotate and provide thrust.

Figure 2:
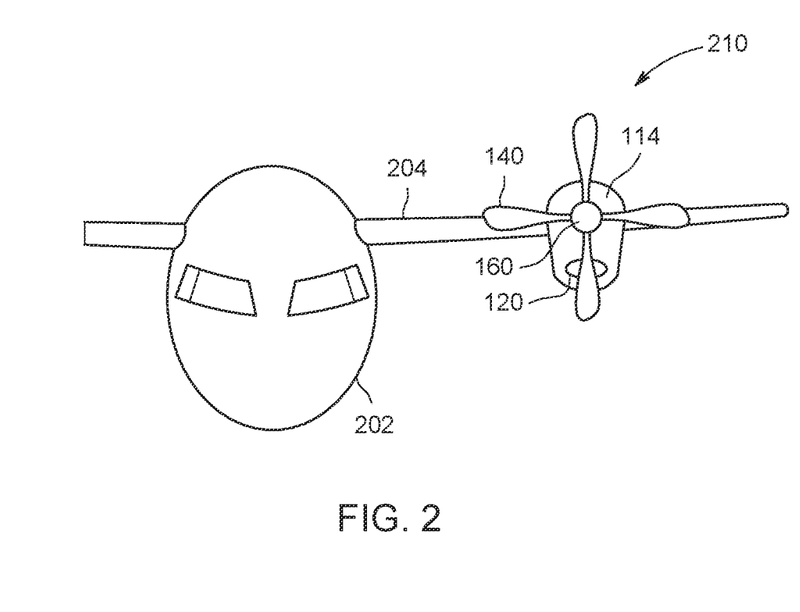
FIG. 2 is a schematic front view of a propeller assembly mounted to a wing of an aircraft according to an embodiment.

The engine 110 in various embodiments is mounted to an aircraft, for example at an aircraft structure 112. The structure 112, for example, may be a wing, or, as another example, may be a fuselage. It may be noted that various concepts and aspects discussed herein apply in various embodiments to aircraft configurations including, as examples, nose mounted single engine turboprops, rear-fuselage-mounted turboprops, open rotors or unducted fans, or distributed prop-driven propulsion architectures having plural propellers mounted at various points of an aircraft. In some embodiments, the engine 110 is a combustion engine. It may be noted that the engine in various embodiments need not necessarily be limited to a combustion engine. Generally, an engine as used herein may be understood as a machine or device that creates motion, or changes energy to mechanical motion. In various embodiments, energy from a fuel and/or battery may be used by an engine to rotate a shaft. For example the engine 110 in some embodiments may represent or include a motor (e.g., to electrically drive a propeller, for example in a hybrid electric application). FIG. 2 provides a schematic front view of an example embodiment in which the engine 110 is mounted to a wing 204 of an aircraft 202. In the illustrated embodiment, the engine 110 is disposed within a nacelle 114. The engine 110 in various embodiments is an internal combustion engine, such as a turbine engine. Generally, the greater rate of air provided via the intake 120, and/or the greater the kinetic energy of the air provided via the intake 120, the higher will be the power or thrust that the engine 110 can provide.

The intake 120 is configured to provide air to the engine 110. Generally, the intake 120 provides a conduit through which air from a surrounding atmosphere may be directed to the engine 110 for combustion with a fuel utilized by the engine 110. The depicted intake 120 includes an intake body 122 that has an inlet opening 124, with an intake upstream lip 125 defined at the inlet opening 124. Air enters the intake 120 via the inlet opening 124, and passes through one or more openings in the intake body 122 to the engine 110. The inlet opening 124 in the illustrated embodiment is disposed in the path of air passing by and driven behind the propeller assembly 130 (or toward the right as seen in FIG. 1). Accordingly, as air passing by the propeller assembly 130 is driven into the intake 120 and to the engine 110, the air received by the engine may have an increase in kinetic energy attributable to impact by the propeller assembly 130, which may increase the efficiency and/or power of the engine 110.

The depicted propeller assembly 130 includes propeller blades 140, propeller root trailing edge airfoils 150, and a propeller spinner 160. It may be noted that a propeller assembly as used herein may also include an inlet and/or nacelle assembly, or design of a propeller assembly may also include desing of an inlet and/or nacelle assembly. FIG. 2 provides a front view of example where the assembly 100 is disposed on a wing 204 of aircraft 202. As seen in FIGS. 1 and 2, the propeller blades 140 rotate about an axis 103 (see FIG. 1) defining a top position 210 and an inlet position 220 (see FIG. 2). The propeller blades 140 are curved or otherwise formed to provide thrust as the propeller blades 140 rotate. As seen in FIG. 1, an output shaft 116 provides a torque from the engine 110 to rotate the propeller blades 140. The propeller assembly 130 is spaced an axial distance 132 from the inlet opening 124 (e.g., intake upstream lip 125) of the intake 120, with air that is passing by the propeller blades 140 (e.g., at or near the inlet position 220 of FIG. 2) entering the intake 120. In various embodiments, modelling of the system 100 includes considering the propeller-inlet interaction for a given propeller blade 140 when that particular blade is at and/or near the inlet position 220, and separately considering the propeller-inlet interaction when that particular blade is at and/or near the top position 210.

In the embodiment illustrated in FIG. 1, each propeller blade 140 is mounted to the output shaft 116 via a hub (not shown) proximal to a root 141 of the blade 140. A spinner 160 covers the hub and the junction of the roots 141 with the hub for protection and improved aerodynamics. A corresponding root trailing edge airfoil 150 may be disposed on a trailing portion 142 of each propeller blade 140 near the root 141 of the particular propeller blade 140. Generally, the root trailing edge airfoil 150 or airfoil trailing edge shape is configured to improve the aerodynamics of the corresponding propeller blade 140 at or near the root 141. In some embodiments, the root trailing edge airfoil 150 may be formed or provided via a cuff that is affixed to a propeller blade. For example, the propeller blade 140 may be initially formed or provided with the root 141 shaped cylindrically. A cuff may then be affixed or otherwise joined to the propeller blade 140 in various embodiments to form the root trailing edge airfoil 150 to provide improved aerodynamics near the root 141. It may be noted that the root trailing edge airfoil 150 in various embodiments may cover or encompass portions of the blade 140 in addition to the trailing edge. It may further be noted the term root trailing edge airfoil as used herein, unless expressly stated otherwise, may refer to a separately formed portion affixed or joined to the propeller blade (e.g., a cuff), or may also refer to a portion of a propeller (e.g., integrally formed portion of a propeller) that has a streamlined airfoil shaping at the trailing edge. Accordingly, the term root trailing edge airfoil as used herein may relate to an aerodynamic feature of the airfoil whether it is manufactured as a separate component or not.

Figure 3:
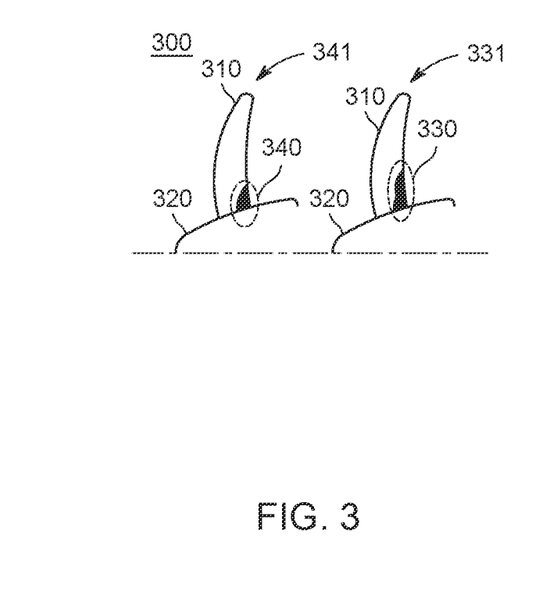
FIG. 3 depicts a side view of a propeller assembly experiencing flow separation.

It may be noted that performance of propeller systems may be adversely affected by separation at or near a propeller root or base of the propeller blades. FIG. 3 illustrates a side view of a propeller assembly 300 including blades 310 and a spinner 320. As seen in FIG. 3, an inlet separation area 330 and a top separation area 340 (corresponding to inlet side 331 and top side 341 of the assembly 300, respectively) represent locations of separation near roots of the blades 310. As seen in FIG. 3, the inlet separation area 330 is different from the top separation area 340 (e.g., larger). For example, in the illustrated embodiment, limited root flow separation is shown away from the inlet for the top separation area 340, whereas significantly more root flow separation is shown in front of the inlet as seen for the inlet separation area 330. Various embodiments model propeller blades at different positions relative to the inlet in order to address the different separation areas that result as the propeller rotates. The particular sizes or shapes of the separation areas are provided by way of example, as the precise size and shapes will vary depending on, among other things, propeller design and operating conditions. For example, the size and location of separation areas may vary, for the same blade design, between climbing and cruising modes of aircraft operation.

With continued reference to FIG. 1, it may further be noted that certain conventional design approaches disregard the unsteady interaction between intakes and propellers, and model the propeller components independently of the intake or other structures, or without consideration of the interaction between the intake (and/or other structures) and the propeller blades. However, interaction between the intake and propeller blades does occur for propeller systems in practice, resulting in inaccurate modeling by such systems, and, as a result, adversely affects propeller and/or engine performance. For example, propeller efficiency and/or noise may be sensitive to or impacted by inlet or intake design (e.g., spacing, shape, air flow, and back pressure) as well as propeller design (e.g., loading, camber, and thickness distributions). Accordingly, various embodiments disclosed herein provide improved performance and/or reduced aeroacoustic noise by providing propeller assembly configurations that account for the presence of the intake 120 (and/or other structures proximate to the propeller assembly 130), and the interaction between the intake 120 (and/or other structures proximate to the propeller assembly 130) and the propeller assembly 130.

Accordingly, in various embodiments, one or more aspects of a configuration of the propeller assembly 130 are designed, manufactured, assembled, or otherwise provided to address or take into account interaction between the propeller assembly 130 and the intake 120. For example, the one or more aspects of a configuration of the propeller assembly 130 may differ from a propeller design that has been provided (e.g., designed) independent of propeller-intake interaction, and accordingly provide improved performance relative to a propeller design provided independent of propeller-intake interaction. In various embodiments one or more of the following aspects of the configuration of the propeller assembly 130 may be designed or otherwise provided to address or take into account interaction between the propeller assembly 130 and the intake 120: an axial distance from the propeller assembly 130 to the inlet opening 124 of the intake 120; propeller aerodynamic loading distribution of the propeller assembly 130; shape of the propeller root trailing edge airfoil 150; shape of the propeller spinner 160. Accordingly, in various embodiments, at least a portion (e.g., one or more of the aspects listed immediately above) of the propeller configuration of the propeller assembly 130 is at least one of sized or shaped to optimize performance of the propeller assembly 130 based on an interaction (e.g., a modelled interaction) between the propeller assembly 130 (e.g., propeller blades 140) and inlet 120.

As used herein, to optimize performance for a design based on an interaction may be understood as providing ideal, maximum, or improved performance as measured or indicated by one or more performance parameters relative to a design that does not consider the interaction (e.g., a design for an engine and airplane configuration that is generally similar but does not account for the interaction as part of a modeling and/or design process). Performance parameters in various embodiments include propeller efficiency (e.g., for improved thrust), engine efficiency, and/or noise. It may be noted that various parameters may be considered together, with performance optimized for a balance of parameters and/or using one or more parameters as a constraint. For example, in some embodiments, a balance of propeller efficiency and engine efficiency may be optimized to optimize aircraft level performance, and use a tolerable or acceptable noise level as a measure of the importance of the propeller interaction effects. Further, aspects such as cost, size, and weight may be used as factors that are weighted and/or balanced with, for example, engine efficiency and propeller efficiency, and/or used as constraints. Further still, the performance of the propeller assembly 130 may be analyzed for multiple modes of aircraft operation, such as takeoff, climb and cruise, with the final design determined using a balance or weighting among one or more performance parameters for the different modes of operation considered. Yet further still, the propeller assembly 130 may be analyzed at multiple rotational positions (e.g., top position 210 and inlet position 220), and an optimization may then use a balance or weighting of performance parameters at the multiple rotational positions.

One example propeller configuration aspect addressed by various embodiments is the axial distance 132 from the propeller assembly 130 to the inlet opening 124 of the intake 120. The axial distance 132 in the depicted embodiment is measured along a direction parallel to the axis 103 about which the propeller assembly rotates, and corresponds to the distance between the inlet opening 124 of the intake and the nearest location (e.g., trailing point 144) of the propeller blade 140 to the inlet opening 124. Certain conventional designs place a propeller assembly as close as practicable to an intake in order to maximize the amount of air energized by propeller blades entering the intake. However, when the blades of a propeller are disposed that closely to an intake, flow separation and increased drag results on the propeller. Also, when the blades of a propeller are positioned at a relatively larger distance from the intake, engine performance can suffer as the inlet duct flow losses can become excessive as the length between the inlet and engine compressor is shortened, while the compressor face is maintained at the same axial position so as to not increase overall engine length. An ideal or improved position may thus be located far enough from the intake to reduce noise and/or flow separation associated with the propellers, while close enough to beneficially impact the inlet flow performance for the engine. The particular position for a given arrangement is determined or selected in various embodiments using modeling systems (e.g., computer simulations or computer modeling systems) that consider or account for the relative placement of propellers and intakes and the interactions therebetween. Accordingly, various embodiments, by utilizing design models that consider the interaction between the intake 120 and the propeller assembly 130, place the propeller assembly 130 at an axial distance 132 that reduces, eliminates, or minimizes flow separation while still providing a desired level of kinetic energy increase to air utilized by the engine 110 to improve engine efficiency and/or reduce noise. It may be noted that in various embodiments the axial distance 132 is greater than a conventionally employed minimal operational clearance, where a minimal operational clearance is understood as a clearance provided between propeller and intake to prevent mechanical interference between the propeller and intake, taking into consideration design and/or manufacturing tolerances and/or a safety factor. It may be noted that the minimal operational clearance may address both manufacturable and mechanical structural considerations. It may further be noted that specifying an axial distance as discussed herein to optimize or improve propeller assembly performance may include not only optimizing propeller efficiency with increased propeller-inlet spacing, but also may balance inlet recovery up to the compressor (which may degrade with increased spacing). Accordingly, various embodiments achieve a balance between propeller efficiency and inlet recovery by specifying the axial distance appropriately. Still further, it may be noted that the intake may be understood as a type of nacelle, and aspects of the concepts discussed herein with respect to the intake may be applied to other nacelles. Accordingly, in various embodiments, interaction between one or more other nacelles (e.g., asymmetric and/or annular nacelles that provide flow distortion to upstream propeller blades) and a propeller assembly may be considered or addressed additionally or alternatively to the interaction between an intake and the propeller blades.

Another example propeller configuration aspect addressed by various embodiments is the propeller aerodynamic loading distribution. A propeller aerodynamic loading distribution as used herein may be understood as a distribution of aerodynamic loading along a length 149 of a propeller blade 140, for example resulting from the size and/or shape of the propeller blade 140 (which varies along the length 149) and the load to which the propeller blade 140 is subjected. Aspects of the propeller blade 140 that may be designed to provide a desired propeller aerodynamic loading distribution taking the interaction between inlet and propeller into account include the twist, chord, camber, thickness, and overall 3D geometry of the propeller blade 140. Generally, in various embodiments, the propeller blade 140 (e.g., twist, chord, camber, thickness) is designed to reduce tip and propeller-inlet interaction noise and improve installed efficiency using design models that consider the interaction between the intake 120 and the propeller assembly 130.

Figure 4:
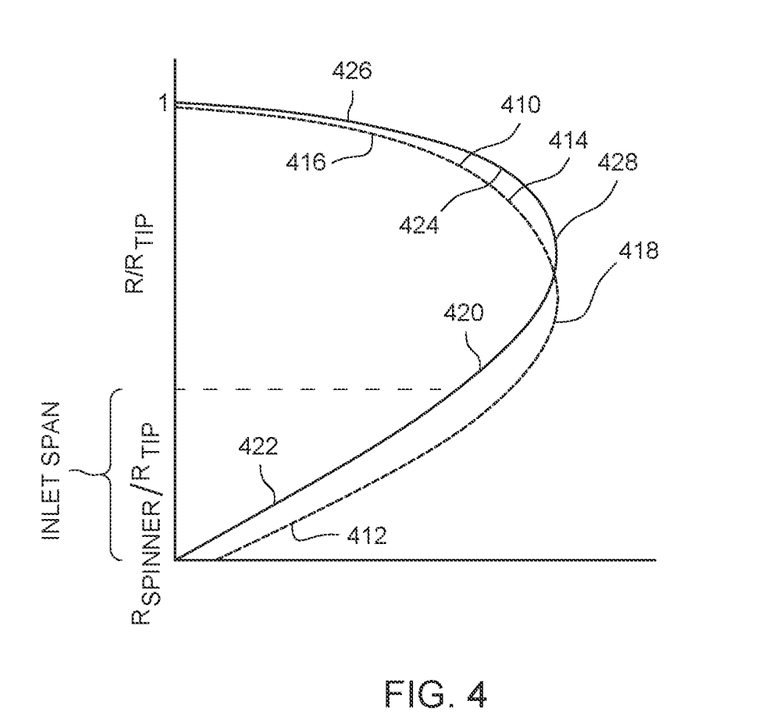
FIG. 4 illustrates example propeller loadings.

FIG. 4 illustrates example propeller loadings. In FIG. 4, the variation of propeller work distribution with respect to the normalized radius $R/R_T$ for a blade is shown (where a low $R/R_T$ corresponds to the root of the blade and a unity $R/R_T$ corresponds to the tip of the blade). Loading curve 410 represents a conventional propeller loading resulting from a design that does not consider the interaction between the intake and the propeller. Loading curve 420, however, represents an embodiment for which the interaction between the intake and the propeller has been taken into consideration. The blade corresponding to loading curve 410 includes a root portion 412, an intermediate portion 414, and a tip portion 416. The blade corresponding to loading curve 420 includes a root portion 422, an intermediate portion 424, and a tip portion 426. As seen in FIG. 4, both the conventional loading curve 410 and the loading curve 420 have relatively unloaded tips for reduced noise at the tip, as seen at the tip portion 416 and the tip portion 426. The root portion 422 of the loading curve 420 has less relative loading than the root portion 412 of the first loading curve 410. Accordingly, the blade corresponding to the loading curve 420 may be understood as having an unloaded cuff or unloaded root relative to conventional designs that do not take intake/propeller interactions into account. It may be noted that an unloaded root or reduced load at the root (or cuff) as used herein may be understood as a reduced load, on average, as the load may vary during rotation. Note that while it may be desirable to increase the total pressure ingested by the engine to improve efficiency, i.e. have a propeller root portion loading similar to 410, the interaction of the propeller with the inlet results in flow separation that negates the total pressure rise, hence unloading the propeller root section as exemplified by 420 results in higher propeller and engine system efficiency. In some embodiments, the intermediate portion 424 of the loading curve 420 has a relatively higher load than the intermediate portion 414 of the loading curve 410. Accordingly, the blade corresponding to the loading curve 420 may be understood in various embodiments as having a more highly loaded intermediate portion relative to conventional designs that do not take intake/propeller interactions into account. For example, a peak 428 of loading curve 420 is positioned outboard compared to the peak 418 of loading curve 410 so that the loading curve 410 may be understood as having peak loading shifted in-board relative to the loading curve 420. Various embodiments may be understood as utilizing blade designs (e.g., shapes, sizes) that reduce loading at the root and increase loading at an intermediate portion to account for inlet interaction and to provide improved installed propeller efficiency. It may be noted that the curves of FIG. 4 are provided by way of example for illustrative purposes, and that, for various propeller designs, the relative differences in the loading curves between conventional approaches and approaches discussed herein may appear differently than as shown in FIG. 4.

Another example propeller configuration aspect addressed by various embodiments is propeller cuff shape near the root of the blade, or the shape of the propeller root trailing edge airfoil 150. Generally, the propeller root trailing edge airfoil 150 may be understood as a portion added to or otherwise forming a part of a propeller blade 140 to provide an airfoil shape used to cover a shank of the propeller blade 140 in order to reduce aerodynamic losses. The propeller root trailing edge airfoil 150, as discussed herein, is disposed on a trailing edge of the propeller blade 140 proximate the root of the propeller blade. The shape of the root trailing edge airfoil 150 in various embodiments may be defined by a twist, chord, camber, thickness, and/or overall 3D geometry of the root trailing edge airfoil 150. The particular shape or configuration of the propeller root trailing edge airfoil 150 for a given arrangement is determined or selected in various embodiments using modeling systems (e.g., computer simulations or computer modeling systems) that consider or account for the interactions between propeller and intake. Accordingly, various embodiments, by utilizing design models that consider the interaction between the intake 120 and the propeller assembly 130, provide a shape for the propeller root trailing edge airfoil 150 that reduces, eliminates, or minimizes flow separation and/or reduces drag and noise. It may be noted that in various embodiments the propeller root trailing edge airfoil 150 has a trailing edge that is thicker than a conventional design that does not account for or consider propeller and intake interactions (e.g., thicker relative to a maximum thickness than a conventional design is).

Figure 5:
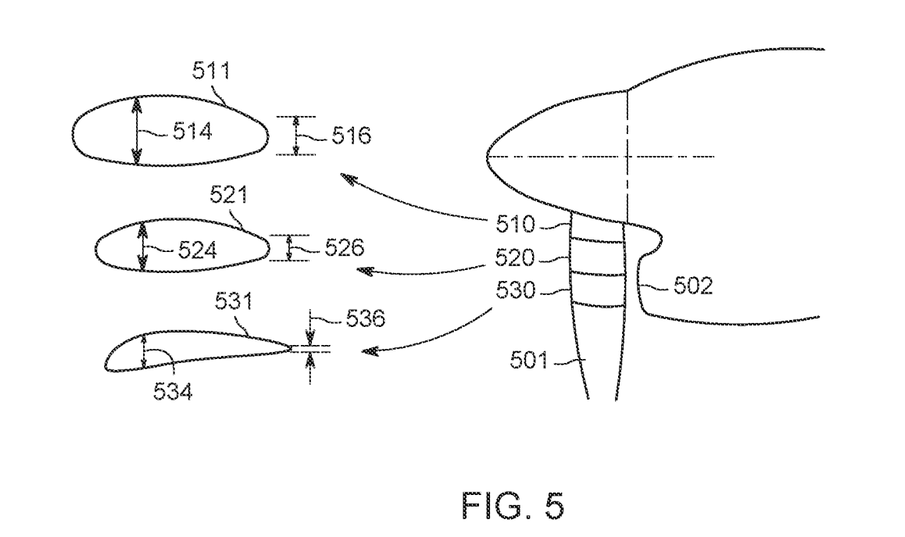
FIG. 5 depicts an example root trailing edge airfoil profile according to an embodiment.

FIG. 5 depicts an example root trailing edge airfoil profile according to an embodiment. As seen in FIG. 5, a propeller 500 having a blade 501 includes a first region 510, a second region 520, and a third region 530. The first region 510 is disposed closer to the root than the second region 520 and the third region 530, while the third region 530 is disposed further from the root than the first region 510 and the second region 520. A first root trailing edge airfoil profile 511 corresponds to the first region, a second root trailing edge airfoil profile 521 corresponds to the second region 520, and a third root trailing edge airfoil profile 531 corresponds to the third region 530. The root trailing edge airfoil profiles depict a cross section of the propeller blade at a portion where the root trailing edge airfoil is disposed, with the root trailing edge airfoil profile corresponding to the profile of the blade with the cuff added or root trailing edge airfoil otherwise formed. In various embodiments, conventional cuff profiles (i.e., cuff profiles designed without accounting for or considering propeller and intake interactions) have thinner trailing edges than the corresponding first root trailing edge airfoil profile 511, second root trailing edge airfoil profile 521, and third root trailing edge airfoil profile 531. In the depicted example, the first region 510, second region 520, and third region 530 are disposed at a position along the length of the propeller blade 501 proximate to an intake 502 (e.g., at the same elevation as portions of the intake 502 when the propeller blade 501 is in the inlet position). For example, conventional cuff profiles may have a trailing edge thickness that is less than roughly 10% of the corresponding maximum thickness. In contrast, in various embodiments of the present disclosure, the propeller root trailing edge airfoil (e.g., propeller root trailing edge airfoil 150) can have a trailing edge thickness that is, for example, more than 10% of the maximum propeller thickness for at least a portion of the propeller root trailing edge airfoil, more than 30% of the maximum propeller thickness, or, as another example, 45% or more of the maximum propeller thickness for at least a portion of the propeller root trailing edge airfoil. Accordingly, in various embodiments, the propeller root trailing edge airfoil has a trailing edge thickness that is thicker than a minimal operational propeller trailing edge thickness, for at least a portion of the propeller root trailing edge airfoil. As used herein, a minimal operational propeller trailing edge thickness may be understood as a trailing edge thickness that satisfies relevant mechanical and/or manufacturing constraints for acceptable performance. In various embodiments, the trailing edge thickness is set to define a limiting flow diffusion rate on the airfoil so as to avoid flow separation.

For example, for the first region 510, the root trailing edge airfoil profile 511 has a maximum thickness 514 and a trailing edge thickness 516. The trailing edge thickness 516 in various embodiments may be within a range of 10%-55% of the maximum thickness 514 over the spanwise region of the blade that interacts with the inlet flow. By comparison, the conventional cuff profile may have a trailing edge thickness that is less than or equal to 10% of the maximum thickness.

Moving further away from the root, for the second region 520, the root trailing edge airfoil profile 521 has a maximum thickness 524 and a trailing edge thickness 526. The trailing edge thickness 526 in various embodiments may be within a range of 10%-45% of the maximum thickness 524. By comparison, the conventional cuff profile may have a trailing edge thickness that is less than 10% of the maximum thickness.

Moving still further away from the root, but at a location corresponding to the intake 502, for the third region 530, the root trailing edge airfoil profile 531 has a maximum thickness 534 and a trailing edge thickness 536. The trailing edge thickness 536 in various embodiments may be within a range of 10%-30% of the maximum thickness 534. By comparison, the conventional cuff profile may have a trailing edge thickness that is less than 10% of the maximum thickness. As seen in FIG. 5, the root trailing edge airfoil profile in various embodiments has a trailing edge thickness that is greater than at least 10% of the maximum thickness, with the trailing edge thickness becoming relatively larger closer to the root of the blade.

Another example propeller configuration aspect addressed by various embodiments is propeller spinner shape, or the shape of the propeller spinner 160. Generally, the propeller spinner 160 may be understood as a streamlined component fitted over a propeller hub. The propeller spinner is generally configured to make the aircraft more streamlined, reducing drag. The particular shape or configuration of the propeller spinner 160 for a given arrangement is determined or selected in various embodiments using modeling systems (e.g., computer simulations or computer modeling systems) that consider or account for the interactions between propeller and intake. Accordingly, various embodiments, by utilizing design models that consider the interaction between the intake 120 and the propeller assembly 130, provide a shape for the propeller spinner 160 that reduces, eliminates, or minimizes flow separation and/or reduces drag and noise.

Figure 6:
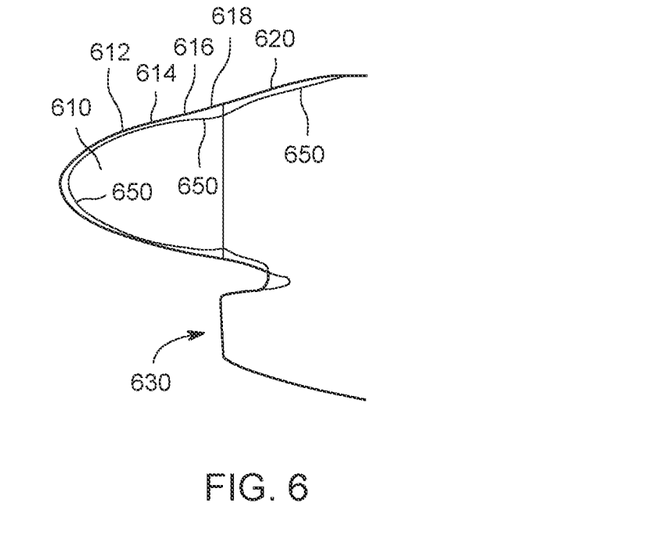
FIG. 6 illustrates a spinner shape profile according to an embodiment.
Figure 7:
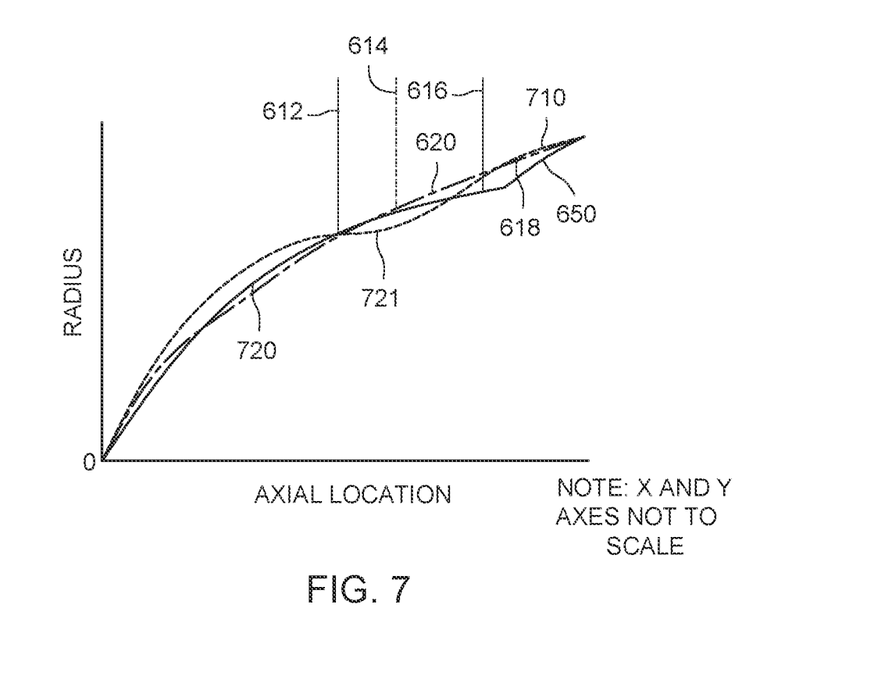
FIG. 7 provides a plot of spinner radius according to an embodiment.

FIG. 6 illustrates a spinner shape profile, and FIG. 7 provides a plot of spinner radius. As seen in FIG. 6, a spinner 610 (e.g., spinner 160) is disposed proximate a nacelle 620 and intake 630. The location on the spinner 610 of the leading edge of an associated propeller blade is indicated by 612, an intermediate portion 614 (corresponding to the location of maximum root airfoil thickness), and a trailing edge location 616 (corresponding to a trailing edge of the propeller blade). Further, the spinner 610 has a nacelle end 618 proximate to the nacelle 620. Also shown in FIG. 6 is a profile 650 for a conventional spinner utilizing a design that does not account for or consider propeller and intake interactions. As seen in FIG. 6, the spinner 610 has a similar radius proximate the leading edge 612 and a larger radius proximate the trailing edge 616 relative to the profile 650. It may be noted that in various embodiments, the propeller spinner 610 has a reducing rate of radial growth between the leading edge 612 and the intermediate portion 614 (which corresponds to a location of maximum propeller blade thickness), which is followed by an increasing rate of radial growth through to and aft of the trailing edge 616. The reducing rate of radial growth in various embodiments is configured to reduce (e.g., minimize), on average, aerodynamic momentum losses for a propeller assembly including the spinner 610 based on the interaction between the propeller assembly and the intake. Also, it may be noted that, as seen in FIG. 6, the transition between the spinner 610 and the nacelle 620 is smoother than for the profile 650.

FIG. 7 illustrates a curve 710 that corresponds to the radius for the spinner 610, and a curve 720 that corresponds to the radius for the spinner profile 650, with corresponding locations for the leading edge 612, intermediate portion 614, trailing edge 616, and nacelle end 618 indicated on FIG. 7 as well. As seen in FIG. 7, the curve 710, relative to the curve 720, has a similar radius at the leading edge 612, a smaller radius at the intermediate portion 614, and a larger radius at the trailing edge 616, as well as a smoother transition to the nacelle at the nacelle end 618. In an alternative embodiment, if the propeller hub hardware constrains the radius at the intermediate portion 614, then the leading edge portion 612 may be scaled outward to larger radii, Following a similar curve 710 simply reshaped to fit the minimum radius at 614. Also, as seen in FIG. 7, the depicted curve 720 has a point of inflection 721 (it may be noted that some embodiments may include two points of inflection, one upstream and one downstream of the intermediate portion 614), whereas the curve 720 does not have a point of inflection between the leading edge and trailing edge. Also as seen in FIG. 7, the radius for the curve 720 (and corresponding spinner 610) has a smaller rate of increase relative to the curve 720 between the leading edge 612 and the intermediate portion 614, but a larger rate of increase relative to the curve 720 between the intermediate portion 614 and the trailing edge 616. Further, the curve 720 (and corresponding spinner 610), relative to the curve 710, has a larger radius at the nacelle edge 618 and a smoother transition to the nacelle. The example spinner shaping depicted for the spinner 610 provides an example of spinner shape design that is provided by a modelling approach that considers or accounts for intake, propeller, and spinner interaction, providing improved performance, for example by controlling flow acceleration and deceleration to reduce separation.

Figure 8:
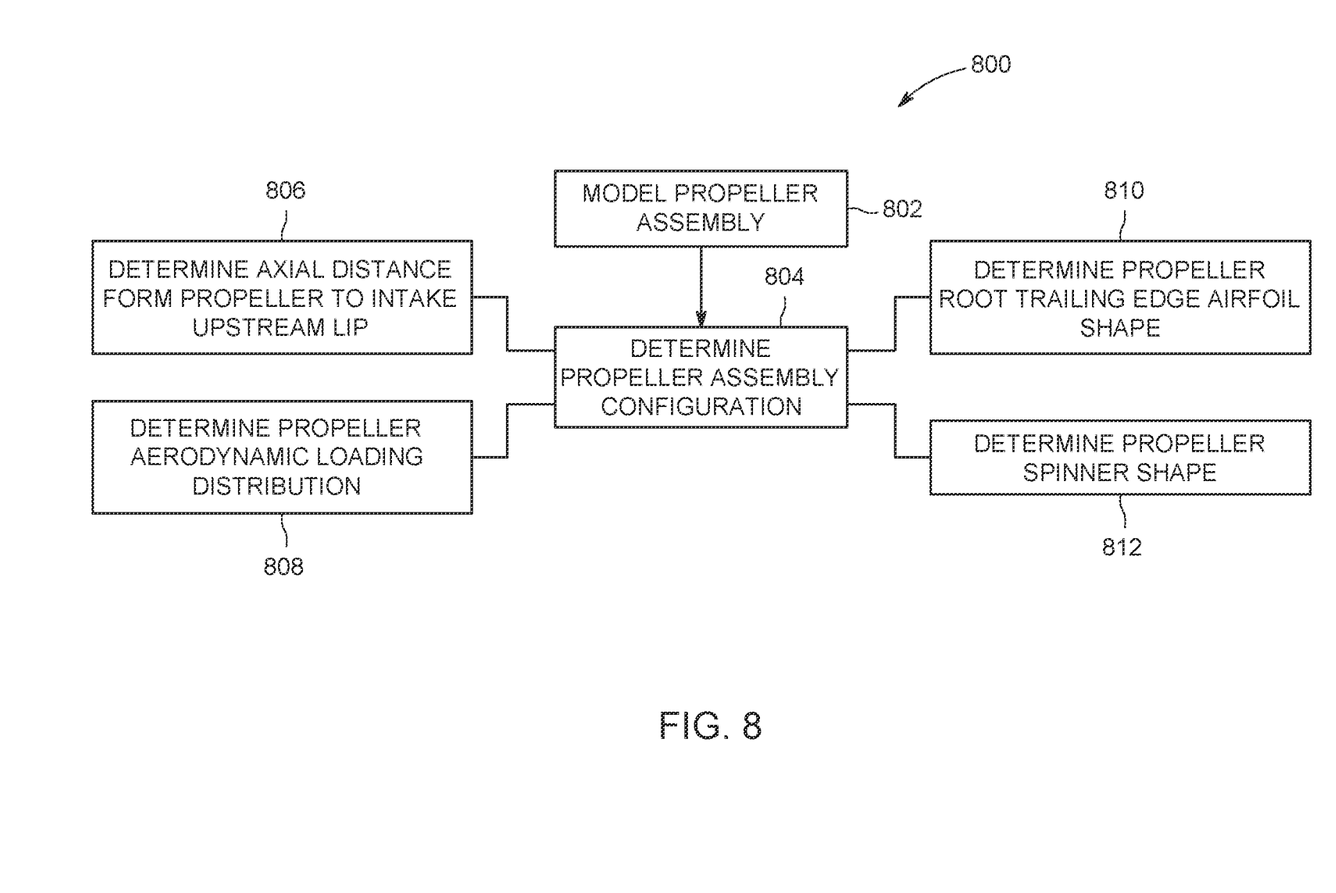
FIG. 8 provides a flowchart of a method according to an embodiment.

FIG. 8 illustrates a flowchart of a method 800. The method 800, for example, may employ structures or aspects of various embodiments (e.g., systems and/or methods) discussed herein, such as the system 100. In various embodiments, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 800 may be used as one or more algorithms to direct hardware to perform one or more operations described herein (e.g., as part of a computer-implemented modelling process). It should be noted, other methods may be used, in accordance with embodiments herein. Generally, the method 800 may be utilized to provide an airplane assembly that includes an engine mounted to at least one of a wing or fuselage of an aircraft, with the engine having an intake. It may be noted that "providing" in the context of the method 800 may include one or more of designing, manufacturing, or assembling the airplane assembly, unless expressly stated otherwise.

At 802, behavior of a propeller assembly to be driven by an engine is modelled. The modelling includes accounting for or considering interaction between the propeller assembly and the engine. For example, effects on the propeller assembly of back pressure caused by an intake of the engine as a propeller passes the intake may be modelled. The interaction in various embodiments is only accounted for in the model when the propeller is at or near the intake.

At 804, a propeller assembly configuration is determined based on the modelling. In the depicted embodiment, the determination is made to optimize performance of the propeller assembly based on the interaction between the propeller assembly and the intake. As discussed herein, the optimization may include a balancing of desired performance attributes (e.g., propeller efficiency, engine efficiency, noise) and/or may include a balancing for different modes of operation (e.g., climbing and cruising). The propeller assembly configuration in various embodiments, as discussed herein, may specify one or more of axial distance from the propeller to an end of the intake, a propeller aerodynamic loading distribution (e.g., a loading distribution corresponding to camber, chord, twist, and/or other geometrical property of a propeller blade), cuff (or trailing edge airfoil) shape (or profile), or propeller spinner shape (or profile).

For example, in the illustrated embodiment, at 806, an axial distance from the propeller to an intake upstream lip of the intake is determined. As discussed herein, the axial distance may be larger than a minimal operational clearance. At 808 of the depicted embodiment, a propeller aerodynamic loading distribution is determined. Also, at 810 of the depicted embodiment, a propeller root trailing edge airfoil shape is determined. In various embodiments, the propeller assembly configuration specifies a twist, chord, camber, thickness, and overall 3 dimensional (3D) geometry of the propeller root trailing edge airfoil. As discussed herein, in some embodiments the trailing edge thickness is thicker than a minimal operational propeller trailing edge thickness for at least a portion of the propeller root trailing edge airfoil. At 812 of the depicted embodiment, a propeller spinner shape is determined.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal language of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, controllers or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" or "an embodiment" of the presently described inventive subject matter are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. An aircraft assembly comprising:
   an engine having an intake defining an inlet opening, and the engine having an output shaft;
   a spinner operably coupled to the output shaft; and
   a propeller blade extending from the spinner between a root and a tip, extending between a leading edge and a trailing edge, and defining a trailing edge thickness, the propeller blade comprising a root portion defined as a spanwise region of the propeller blade that interacts with an inlet flow at the inlet opening, and an intermediate portion nearer to the tip than the root portion, with the root portion comprising a root portion maximum thickness;
   wherein the trailing edge thickness for the propeller blade in the root portion is within a range of 10%-55% of the root portion maximum thickness; and wherein the trailing edge thickness within the intermediate portion is less than 10% of a maximum thickness of the intermediate portion.

2. The aircraft assembly of claim 1 wherein the trailing edge thickness decreases in a radially outward direction toward the tip along the inlet opening.

3. The aircraft assembly of claim 1 wherein the propeller blade has a configuration with an aerodynamic loading distribution comprising a reduced loading along the root portion, and an increased loading at the intermediate portion.

4. The aircraft assembly of claim 3 wherein the aerodynamic loading distribution comprises a peak loading located within the intermediate portion.

5. The aircraft assembly of claim 4 wherein the peak loading is located radially beyond a halfway point of a normalized radius R/RT for the propeller blade.

6. The aircraft assembly of claim 1 wherein the spinner has an axial profile where the spinner has a reducing rate of radial growth between the leading edge and a location of a maximum propeller thickness followed by an increasing rate of radial growth through to the trailing edge defined by the propeller blade.

7. The aircraft assembly of claim 6 wherein the reducing rate reduces, on average, aerodynamic momentum losses for the propeller blade based on an interaction between the propeller blade, the spinner and the intake.

8. The aircraft assembly of claim 1 wherein the trailing edge is spaced from the intake by an axial distance, wherein a relationship between the propeller blade and the intake has a minimum operational distance, and wherein the axial distance is greater than the minimal operational distance.

9. The aircraft assembly of claim 8 wherein the axial distance is far enough from the intake to reduce noise and/or flow separation associated with the propeller blades, while close enough to balance inlet recovery up to a compressor of the engine.

10. A propeller blade for an engine for an aircraft assembly having an intake defining an inlet opening, the propeller blade comprising:
a body extending between a root and a tip, extending between a leading edge and a trailing edge, and defining a trailing edge thickness, the body comprising a root portion defined as a span-wise region of the propeller blade that interacts with an inlet flow at the inlet opening, and an intermediate portion nearer to the tip than the root portion, wherein the root portion defines a root portion maximum thickness;
wherein the trailing edge thickness for the root portion is within a range of 10%-55% of the root portion maximum thickness; and
wherein the trailing edge thickness for the intermediate portion is less than 10% of a maximum thickness of the intermediate portion.

11. The propeller blade of claim 10 wherein an aerodynamic loading distribution defined by the body comprises a peak loading located within the intermediate portion.

12. The propeller blade of claim 11 wherein the peak loading is located radially beyond a halfway point of a normalized radius R/RT for the body.

13. The propeller blade of claim 12 further comprising a spinner having an axial profile with a reducing rate of radial growth between the leading edge and a location of a maximum propeller thickness followed by an increasing rate of radial growth through to the trailing edge defined by the propeller blade, and wherein the reducing rate reduces, on average, aerodynamic momentum losses for the propeller blade based on an interaction between the propeller blade, the spinner, and the intake.

14. The aircraft assembly of claim 1 wherein the root portion comprises a first region, a second region nearer to the tip than the first region, and a third region nearer to the tip than the second region, and wherein the first region defines a first maximum thickness, the second region defines a second maximum thickness, and the third region defines a third maximum thickness, wherein the trailing edge thickness for the propeller blade at the first region is within the range of 10%-55% of the first maximum thickness.

15. The aircraft assembly of claim 14 wherein the trailing edge thickness for the second region is within a range of 10%-45% of the second maximum thickness.

16. The aircraft assembly of claim 15 wherein the trailing edge thickness for the third region is within a range of 10%-30% of the third maximum thickness.

17. The aircraft assembly of claim 14 wherein the trailing edge thickness for the first region is thicker than the trailing edge thickness for the second region, and wherein the trailing edge thickness for the second region is thicker than the trailing edge thickness for the third region.

18. The propeller blade of claim 10 wherein the trailing edge thickness decreases in a direction toward the tip at least along the inlet opening.

19. The aircraft assembly of claim 10 wherein the root portion comprises a first region, a second region nearer to the tip than the first region, and a third region nearer to the tip than the second region, and wherein the first region defines a first maximum thickness, the second region defines a second maximum thickness, and the third region defines a third maximum thickness, wherein the trailing edge thickness for the propeller blade at the first region is within the range of 10%-55% of the first maximum thickness.

20. The aircraft assembly of claim 14 wherein the trailing edge thickness for the second region is within a range of 10%-45% of the second maximum thickness, and wherein the trailing edge thickness for the third region is within a range of 10%-30% of the third maximum thickness.

* * * * *